United States Patent
Jung et al.

(10) Patent No.: US 9,024,904 B2
(45) Date of Patent: May 5, 2015

(54) APPARATUS AND METHOD FOR IMPROVING INPUT POSITION AND PRESSURE DETECTION IN A PRESSURE DETECTION TOUCH SCREEN

(71) Applicant: Samsung Electronics Co., Ltd., Gyeonggi-do (KR)

(72) Inventors: Ji-Hyun Jung, Gyeonggi-do (KR); Shi-Yun Cho, Gyeonggi-do (KR); Seok-Myong Kang, Gyeonggi-do (KR); Kyung-Wan Park, Gyeonggi-di (KR); Ho-Seong Seo, Gyeonggi-di (KR); Dae-Kwang Jung, Gyeonggi-do (KR); Youn-Ho Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 122 days.

(21) Appl. No.: 13/953,286

(22) Filed: Jul. 29, 2013

(65) Prior Publication Data

US 2014/0035849 A1 Feb. 6, 2014

(30) Foreign Application Priority Data

Aug. 1, 2012 (KR) .................. 10-2012-0084270

(51) Int. Cl.
*G06F 3/041* (2006.01)
*G06F 3/0488* (2013.01)

(52) U.S. Cl.
CPC .............. *G06F 3/041* (2013.01); *G06F 3/0488* (2013.01); *G06F 3/0414* (2013.01); *G06F 3/0418* (2013.01)

(58) Field of Classification Search
None
See application file for complete search history.

(56) References Cited

U.S. PATENT DOCUMENTS

2008/0142280 A1* 6/2008 Yamamoto et al. ........ 178/18.02
2009/0315838 A1* 12/2009 Geiger .......................... 345/173

* cited by examiner

*Primary Examiner* — Muhammad N Edun
(74) *Attorney, Agent, or Firm* — The Farrell Law Firm, P.C.

(57) ABSTRACT

An apparatus and method for improving input position and pressure detection in a pressure detection touch screen. The method includes detecting a touch input on a touch screen; generating compensated pressure information for compensating for inaccurate pressure information detected from the touch input, when the touch input is detected in an outer area on the touch screen; and generating compensated location information using the compensated pressure information.

12 Claims, 11 Drawing Sheets

|  | Y1 | Y2 | Y3 | Y4 | Y5 | Y6 |
|---|---|---|---|---|---|---|
| X1 | 0.102 | 0.006 | 0.000 | 0.016 | 0.009 | 0.002 |
| X2 | 0.892 | 0.504 | 0.000 | 0.000 | 0.000 | 0.002 |
| X3 | 0.100 | 0.006 | 0.000 | 0.016 | 0.009 | 0.002 |
| X4 | 0.000 | 0.000 | 0.000 | 0.000 | 0.000 | 0.000 |
| X5 | 0.000 | 0.000 | 0.000 | 0.000 | 0.000 | 0.000 |

FIG.14B

|  | Y1 | Y2 | Y3 | Y4 | Y5 | Y6 |
|---|---|---|---|---|---|---|
| X1 | 0.034 | 0.006 | 0.000 | 0.016 | 0.009 | 0.002 |
| X2 | 0.294 | 0.504 | 0.000 | 0.000 | 0.000 | 0.002 |
| X3 | 0.033 | 0.006 | 0.000 | 0.016 | 0.009 | 0.002 |
| X4 | 0.000 | 0.000 | 0.000 | 0.000 | 0.000 | 0.000 |
| X5 | 0.000 | 0.000 | 0.000 | 0.000 | 0.000 | 0.000 |

APPARATUS AND METHOD FOR IMPROVING INPUT POSITION AND PRESSURE DETECTION IN A PRESSURE DETECTION TOUCH SCREEN

PRIORITY

This application claims priority under 35 U.S.C. §119(a) to Korean Application Serial No. 10-2012-0084270, which was filed in the Korean Intellectual Property Office on Aug. 1, 2012, the entire content of which is hereby incorporated by reference.

BACKGROUND OF THE INVENTION

1. Field of the Invention

The present invention relates generally to a pressure type touch screen, and more particularly, to a method, a computer-readable storage medium, and a portable terminal that prevent an erroneous recognition of an input by compensating for an error of an input position on a pressure detection touch screen.

2. Description of the Related Art

In general, a touch screen includes a touch panel on a display screen to detect a touch point through the touch panel from an electrical change according to an operation of an input device on the display screen. When a user touches an icon or a character displayed on the touch screen, the device executes a command for selecting or operating various menus by matching a coordinate on the display screen with a touch point coordinate on the touch panel.

Basically, the touch panel includes a sensor for detecting a touch on the touch panel. For example, the touch panel may be a resistive touch panel or a capacitive touch panel according to the type of sensor therein.

A touch screen that includes a resistive overlay touch panel is commonly known as a pressure detection touch screen. In the touch panel included in the pressure detection touch screen, a value of an electrical resistance of a sensor that is formed in the touch panel is changed by an external pressure caused by a touch thereon. Therefore, the pressure detection touch screen detects a change of a resistance value by the external pressure of the user input, thereby detecting the touch.

However, for a portable terminal including a touch screen, a problem often occurs in that the external pressure from a user input is erroneously detected due to a housing unit of the portable terminal connected to the touch screen. That is, when an external pressure from a user input is applied to the touch screen, a repulsive force by the housing unit of the portable terminal is generated. Also, the external pressure from the user input is added to the repulsive force of the housing unit, such that a problem occurs in that a pressure is erroneously detected on the touch screen.

Basically, the housing unit of a portable terminal often prevents the touch screen from moving in response to pressure from a user input, when the user input is made on an outer area of the touch screen, i.e., closer to the housing unit.

SUMMARY OF THE INVENTION

The present invention is designed to address at least the problems and/or disadvantages described above and to provide at least the advantages described below.

Accordingly, an aspect of the present invention is to provide a method for preventing an erroneous recognition of an input by compensating for position information of an input by a user in a pressure detection touch screen and a technology related to a portable terminal.

In accordance with an aspect of the present invention, a method for improving input position and pressure detection in a pressure detection touch screen is provided. The method includes detecting a touch input on a touch screen; generating compensated pressure information for compensating for inaccurate pressure information detected from the touch input when the touch input is detected in an outer area on the touch screen; and generating compensated location information using the compensated pressure information.

In accordance with another aspect of the present invention, a portable terminal is provided. The portable terminal includes a pressure detection touch screen; and a controller configured detect a touch input on a touch screen, generate compensated pressure information for compensating for inaccurate pressure information detected from the touch input when the touch input is detected in an outer area on the touch screen, and generate compensated location information using the compensated pressure information.

In accordance with another aspect of the present invention, a non-transitory machine readable recording medium is provided for storing a program for executing a method for improving input position and pressure detection of a pressure detection touch screen. The method includes detecting a touch input on a touch screen; determining whether the touch is detected in an outer area on the touch screen; when the touch is detected in the outer area on the touch screen, generating compensated pressure information for compensating for inaccurate pressure information detected from the touch input; and generating compensated location information using the compensated pressure information.

In accordance with another aspect of the present invention, a portable terminal is provided, which includes a pressure detection touch screen and a non-transitory machine readable recording medium for storing a program for executing a method for improving input position and pressure detection of a pressure detection touch screen. The method includes detecting a touch input on a touch screen; determining whether the touch is detected in an outer area on the touch screen; when the touch is detected in the outer area on the touch screen, generating compensated pressure information for compensating for inaccurate pressure information detected from the touch input; and generating compensated location information using the compensated pressure information.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
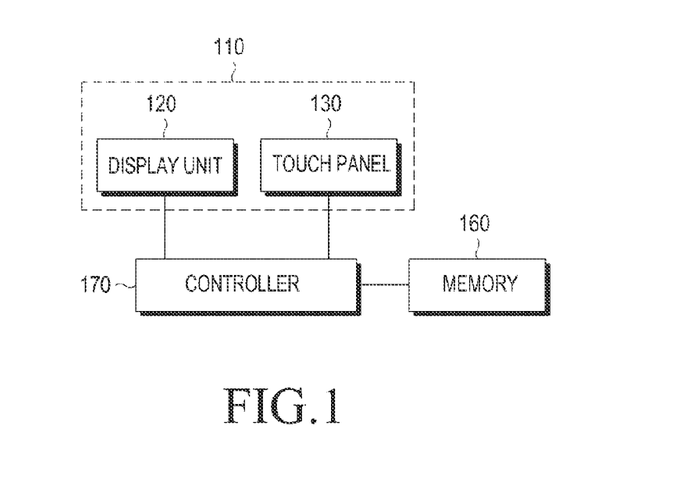
FIG. 1 illustrates a portable terminal according an embodiment of the present invention.

FIG. 1 illustrates a portable terminal according an embodiment of the present invention.

Referring to FIG. 1, the portable terminal includes a touch screen 110, a memory 160, and a controller 170. The touch screen 110 includes a display unit 102 that displays images and a touch panel 130. For example, the display unit 120 includes a Liquid Crystal Display (LCD), an Organic Light Emitting Diode (OLED), and/or an LED.

The touch panel 130 can be placed below or above the display unit 120.

For example, a user can enable an application or a link page related to an item to be executed by touching various executable items displayed on the touch screen 110. In this example, the display unit 120 is placed in front of the portable terminal 100 and the touch panel 130 is placed on top of the display unit 120. When the touch panel 130 is transparent, the touch panel may be placed in front of the portable terminal 100.

The touch panel 130 is a pressure detection type touch panel that detects a user input. When the surface of the touch screen 110 is pressed by the user (for example, using a finger, a stylus pen, etc.), the touch panel 130 outputs pressure information including of at least one of position as an input position (or a coordinate) and an input pressure.

The controller 170 controls the overall operation of the portable terminal and components thereof. For example, the controller 170 detects a touch on the touch screen 110, and when the touch is detected, determines if the touch is detected from an outer area of the touch screen 110. When the touch is detected in the outer area of the touch screen 110, the controller 170 generates compensated pressure information by compensating for inaccurate pressure information detected from the touch in the outer area of the touch screen 110. Further, the controller 170 generates compensated position information by compensating inaccurate position information detected from the touch in the outer area of the touch screen 110, using the compensated pressure information. Also, the controller 170 may control the compensation of the pressure information that may increase or decrease the pressure information by applying a compensation ratio of each pre-determined outer area.

When the touch is not detected in the outer area of the touch screen 110, the controller 170 determines that the detected pressure and position information are considered to be accurate, and no compensation is performed.

Figure 2:
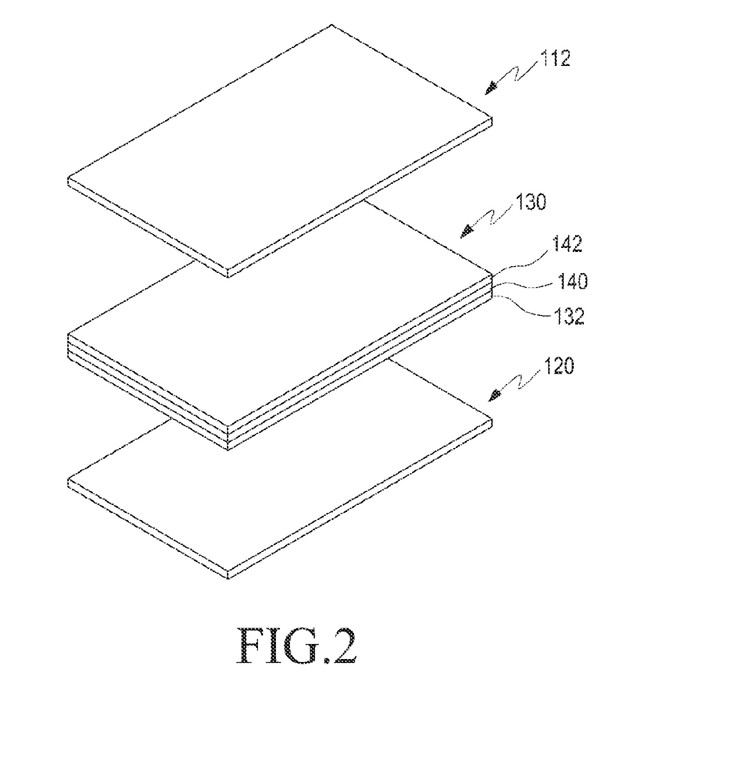
FIG. 2 is a perspective view illustrating a separated touch screen according an embodiment of the present invention.

FIG. 2 is a perspective view illustrating a separated touch screen according an embodiment of the present invention.

Referring to FIG. 2, the touch screen has a layered configuration, in which the touch panel 130, the display unit 120, and a window 112 are adhered to each other, or are fully or partially separated.

The window 112 may be formed by a synthetic resin or plastic materials, such as PolyEthylene Terephthalate (PET). The window 112 protects the touch panel 130 and provides a touch surface for the user.

Alternatively, the display unit 120 may include the window 112. In addition, the touch panel 130 may be placed below or above the display unit 120.

The touch panel 130 includes a sensor layer 140 that identifies position information of a user input and pressure information, and first and second substrates 132 and 142, which support the sensor layer 140, are layered on a lower and upper surface of the sensor layer 140, respectively.

Figure 3:
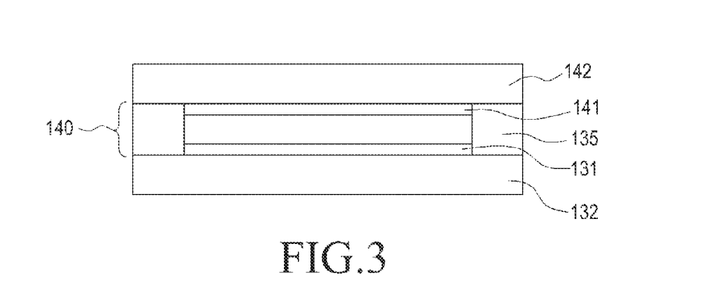
FIG. 3 is a cross-sectional view illustrating a sensor layer included in a touch panel according an embodiment of the present invention.

FIG. 3 is a cross-sectional view illustrating a sensor layer included in a touch panel according an embodiment of the present invention.

Referring to FIG. 3, the sensor layer 140 is layered on an upper surface of the first substrate 132 and a lower surface of the second substrate 142. The sensor layer 140 includes a first electrode pattern 131, a second electrode pattern 141, and a spacer 135. The first electrode pattern 131 and the second electrode pattern 141 are formed to oppose to each other on the upper surface of the first substrate 132 and the lower surface of the second substrate 142, respectively.

For example, the first electrode pattern 131 and the second electrode pattern 141 may be formed as a film in which transparent conductive materials such as Indium-Tin Oxide (ITO) or Induim-Zinc Oxide (IZO) are deposited. Also, an electrode wiring connected to the first electrode pattern 131 and the second electrode pattern 141 may be formed in the first electrode pattern 131 and the second electrode pattern 141. The electrode wiring is connected to the first electrode pattern 131 and the second electrode pattern 141 and transmits, to the controller 170, a change of voltage, current, or resistance according to an input from the user.

The spacer 135 secures an interval between the second electrode pattern 141 and the first electrode pattern 131 when a bending occurs in the second substrate 142 due to an external pressure from the user input, such that an opening is formed to allow the second electrode pattern 141 to approach the first electrode pattern 131. Additionally, the sensor unit 140 may include a dot spacer including an insulating synthetic resin in order to prevent a malfunction of the touch panel 130.

Figure 4:
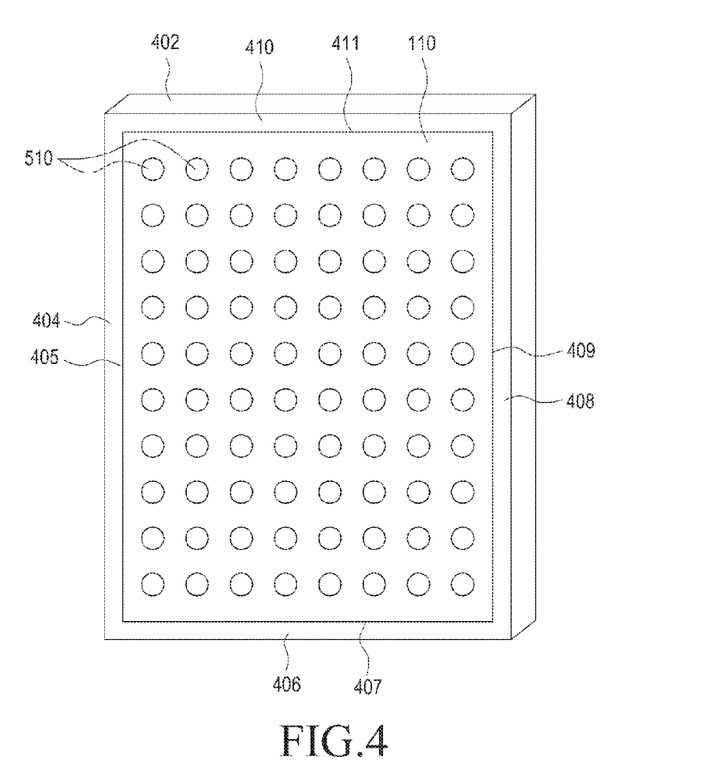
FIG. 4 illustrates a portable terminal according to an embodiment of the present invention.

FIG. 4 illustrates a portable terminal according to an embodiment of the present invention.

Referring to FIG. 4, the touch screen 110, which is attached to the portable terminal, may be used as a user interface of the portable terminal. As described above, the portable terminal receives position information and pressure information for a user input through the touch screen 110. For example, when the portable terminal is a smart phone, various applications may be executed by receiving the position and the pressure information of the user input from the touch screen 110.

The portable terminal includes a housing 402 that makes up an outer wall of the portable terminal and protects the internal components of portable terminal. The housing 402 is formed to be adjacent to an exterior of the touch screen 110, i.e., four sides 405, 407, 409, and 411 of the touch screen 110 are adjacent to four sides 404, 406, 408, and 410 of the housing 402.

The touch screen 110 illustrated in FIG. 4 may include the first electrode pattern 131 that is layered on the upper surface of the first substrate 132, and the second electrode pattern 141 that is layered on the lower surface of the second substrate 142, as described in conjunction with FIGS. 2 and 3. In FIG. 4, the first electrode pattern 131 and the second electrode pattern 141 have a linear grid-like pattern.

The first electrode pattern 131 and the second electrode pattern 141 are formed with a plurality of electrodes respectively. The plurality of electrodes are placed to face each other as 1:1 and form a unit sensor 510. That is, the first electrodes formed as the linear grid-like pattern in the first electrode pattern 131 and the second electrodes formed as the linear grid-like pattern in the second electrode pattern 141 face each other in a vertical direction as 1:1 to form the unit sensor 510 as the linear grid-like pattern.

The unit sensors 510 detects an external pressure from a user input. As described above, a bending may occur in the second substrate 142 according to the external pressure from the user input. Further, due to the bending, the second electrodes of the second electrode pattern 141 layered on the lower surface of the second substrate 142 approach the first electrode of the first electrode pattern 131 layered on the upper surface of the first substrate 131. Here, a resistance value, a current value, and a voltage value of a position formed by the first electrodes and the second electrodes may change as the first electrodes and the second electrodes approach each other. Also, at least one of the changed resistance value, the current value, or the voltage value is transmitted to the controller 170 through the electrode wires connected to at least one of the first electrode pattern 131 and the second electrode pattern 141.

The controller 170 extracts position information and pressure information of an input position of the user input by receiving at least one of the changed resistance value, the current value, or the voltage value. For example, the controller 170 extracts the position information and the pressure information of the input position by using the pre-stored position information or pressure information corresponding to at least one of the resistance value, the current value, or the voltage value. That is, the controller 170 extracts the pre-stored position information and the pressure information corresponding to at least one of the resistance value, the current value, or the voltage value received from the controller 170 through the electrode wires connected to at least one of the first electrode pattern 131 and the second electrode pattern 141 and generates the position information and the pressure information using the extracted information.

Figure 5:
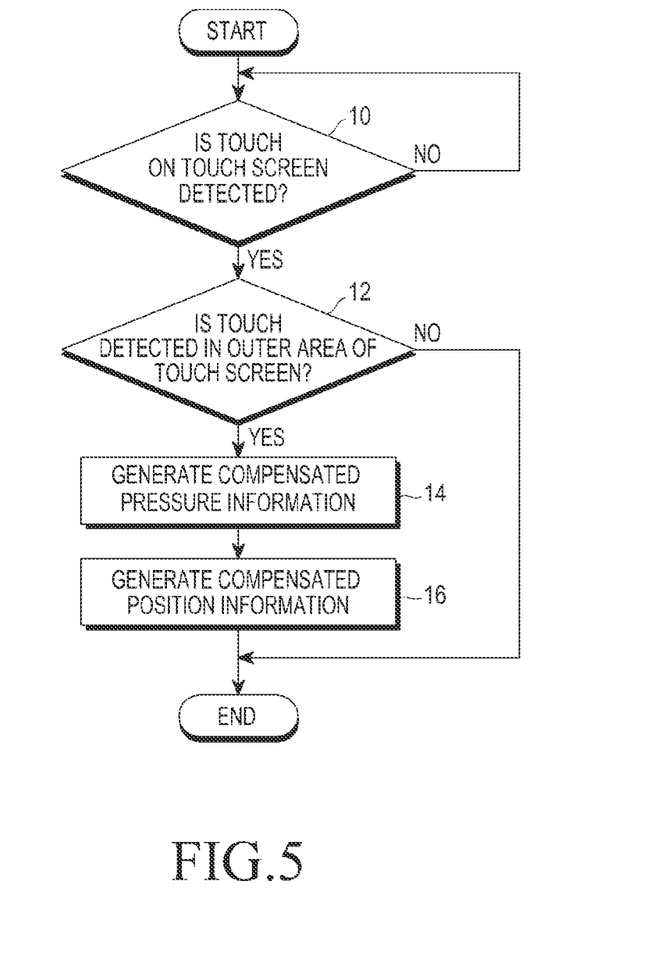
FIG. 5 is a flowchart illustrating a method of compensating for an input position error of a pressure detection touch screen according to an embodiment of the present invention.

FIG. 5 is a flowchart illustrating a method of compensating for an input position error of a pressure detection touch screen according to an embodiment of the present invention.

Referring to FIG. 5, in step 10, the controller 170 detects a touch on the touch screen 110. As described above, the controller 170 detects the touch generated on the touch screen 110 by the user input through the touch panel 130 included in the touch screen.

In step 12, the controller 170 determines if the touch is detected on an outer area of the touch screen 110, i.e., a non-central area of the touch screen 110.

Figure 6:
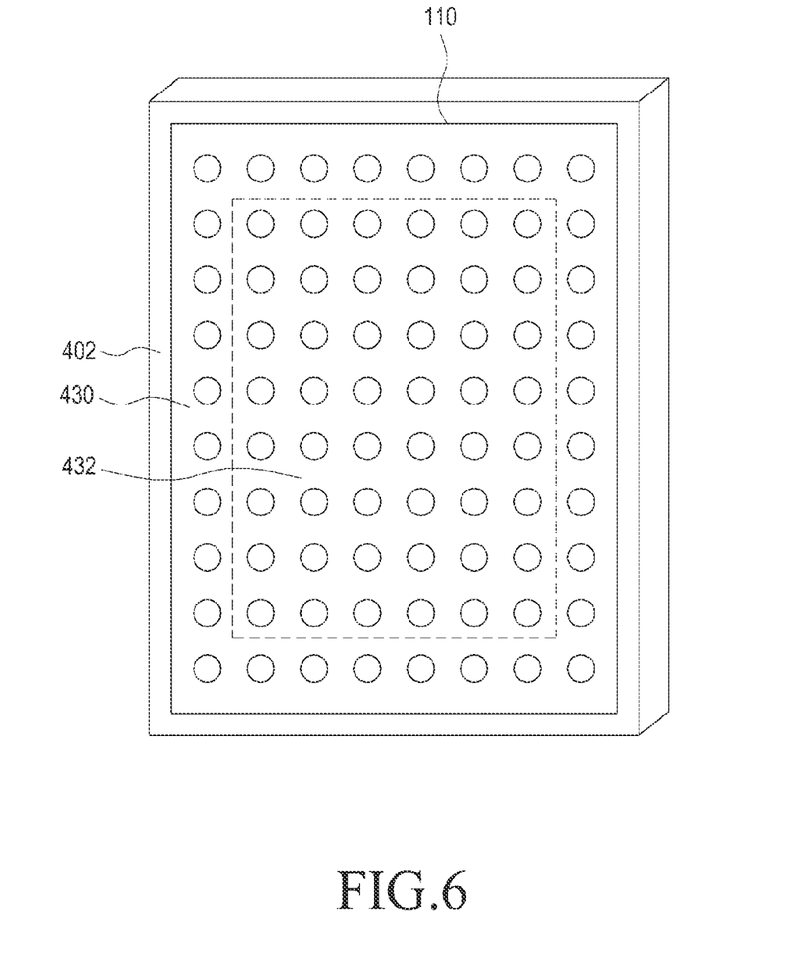
FIG. 6 is a view illustrating a portable terminal according to an embodiment of the present invention.

FIG. 6 illustrates a portable terminal according to an embodiment of the present invention. Specifically, FIG. 6 illustrates an outer area 430 and a central area 432 of the touch screen 110.

Referring to FIG. 6, the controller 170 may determine if an input position is located in the outer area 430 or the central area 432 by using the position information detected in step 10 of FIG. 5.

Referring again to FIG. 5, in step 14, the controller 170 compensates for inaccurate pressure information detected from the touch, when the touch is detected in the outer area 430 of the touch screen 110. As described above, touch inputs in the outer area 430 of the touch screen 110 are affected by the housing of the portable terminal, which does not allow the outer area 430 of the touch screen 110 to bend completely in response to the touch input pressure.

Basically, the controller 170 compensates for inaccurate pressure information detected from a touch in the outer area 430 of the touch screen 110, but performs no compensation when the touch is not detected in the outer area 430 of the touch screen 110.

Again, in a pressure detection touch screen, the pressure information detected by the controller 170 may be inaccurate from an actual touched pressure, when the touch occurs in the outer area 430 of the touch screen 110, which is adjacent to the housing unit 402 of the touch screen 110. Basically, because the touch screen 110 is fixed to the housing unit 402 of the portable terminal, the pressure information may be affected by a repulsive force of the housing unit 402. Therefore, by compensating for the inaccurate detections in the outer area 430, the controller 170 reduces input position detection errors from the touch screen 110.

In step 16, the controller 170 generates compensated position information by compensating for inaccurate position information detected from the touch, based on the compensated pressure information. That is, the controller 170 compensates for the erroneously detected position information using the compensated pressure information.

For example, the controller 170 generate compensated position information by comparing pre-stored compensated position information corresponding to compensated pressure information and compensated position information. Herein, the pre-stored compensated position information may be stored in the memory 160 included in the portable terminal. That is, the controller 170 generates the compensated position information corresponding to the compensated pressure information using the pre-stored compensated position information corresponding to the compensated pressure information stored in the memory 160.

Additionally, the memory 160 may pre-store the pre-stored compensated position information corresponding to at least one of a resistance value, a current value, or a voltage value, along with the compensated pressure information. Therefore, the controller 170 may generate the compensated position information by comparing the pre-stored compensated position information corresponding to at least one of the resistance value, current value, or the voltage value and with the compensated pressure information.

Figure 7:
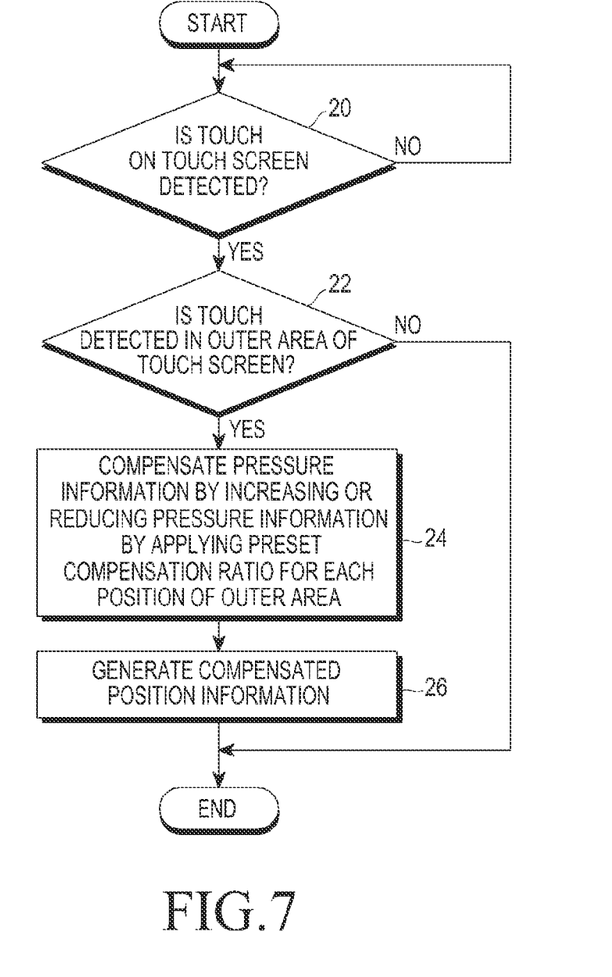
FIG. 7 is a flowchart illustrating a method of compensating for an input position error of a touch detection touch screen according to an embodiment of the present invention.

FIG. 7 is a flowchart illustrating a method of compensating for an input position error of a touch detection touch screen according to an embodiment of the present invention.

Referring to FIG. 7, in step 20, the controller 170 detects a touch on the touch screen 110.

In step 22, the controller 170 determines if the touch is detected in the outer area 430 of the touch screen 110.

In step 24, when the touch is detected in the outer area 430 of the touch screen 110, the controller 170 compensates inaccurate pressure information detected from the touch input by increasing or reducing the detected pressure information by applying a compensation ratio for each position of a preset outer area. That is, the controller 170 generates the compensated pressure information by increasing or reducing the inaccurately detected pressure information by applying the compensation ratio for each position of the outer area 430 from the touch screen 110. The compensation ratio for each position is differentiated because a degree of erroneous detection of the pressure information may vary depending on the position of the touch screen 110.

Figure 8:
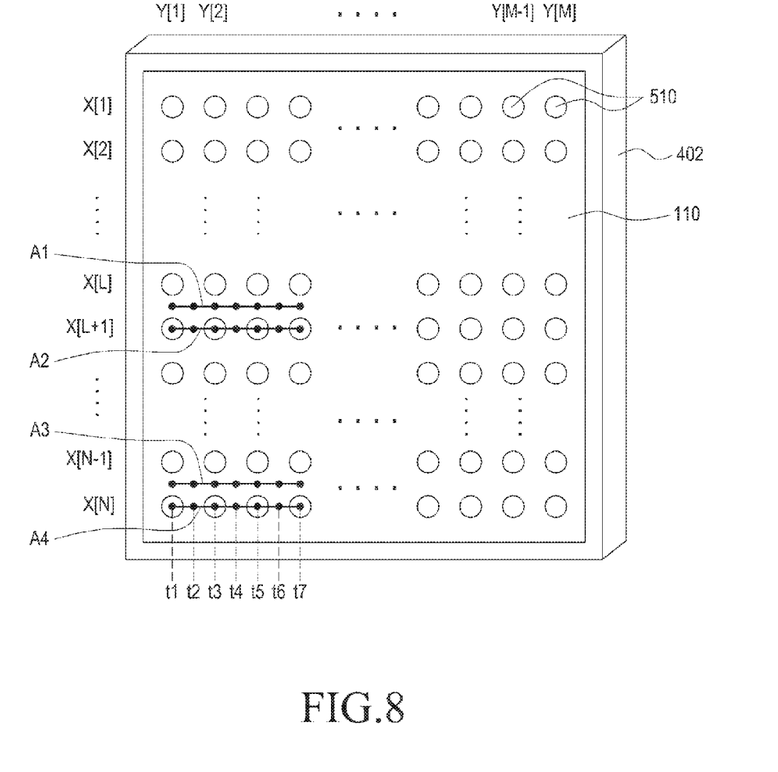
FIG. 8 illustrates a portable terminal according to an embodiment of the present invention.

FIG. 8 illustrates a portable terminal according to an embodiment of the present invention.

Referring to FIG. 8, the portable terminal includes the touch screen 110, wherein the unit sensors 510 are formed in the sensor layer 140 of the touch panel 130 included in the touch screen 110. Again, the unit sensors 510 are formed in a linear grid-like pattern including N number of rows (X) and M number of columns (Y). However, the unit sensors 510 have different degrees of inaccuracy depending on their respective positions. Basically, the unit sensors 510 that are located closer to the housing unit 402 are more inaccurate.

Figure 9:
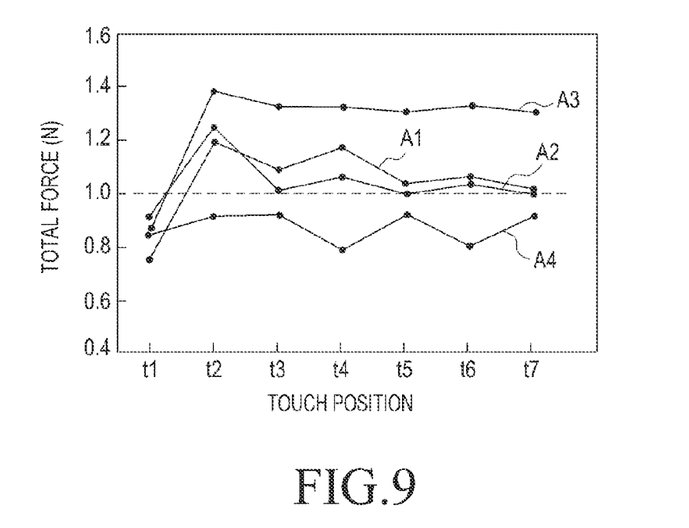
FIG. 9 is a graph illustrating total pressure according to each position on a touch screen according to an embodiment of the present invention.

FIG. 9 is a graph illustrating total pressure according to each position on a touch screen according to an embodiment of the present invention.

Referring to FIG. 9, the graph shows a total pressure of a touch at each position (t1 to t7) on the touch screen 110. The line A1 indicates the total pressure at a position A1 on the touch screen 110 in FIG. 8. The A1 position in FIG. 8 indicates the position on the touch screen 110 between the unit sensors 510 on a row X[L] and the unit sensors on a row X[L+1]. Here, L is greater than or equal to 2 and less than or equal to N−2. Additionally, the position A1 in FIG. 8 may include a touch position t1 at row Y1, a touch position t2 between row Y1 and row Y2, a touch position t3 at row Y2, a touch position t4 between row Y2 and row Y3, a touch position t5 at row Y3, a touch position t6 between row Y3 and row Y4, and a touch position t7 at row Y4.

The line A2 in FIG. 9 indicates a total pressure at the position A2 on the touch screen 110 in FIG. 8. The position A2 in FIG. 8 are positions of the unit sensors 510 of the line X[L+1] on the touch screen 110. The position A2 in FIG. 8 may include the touch position t1 at row Y1, the touch position t2 between row Y1 and row Y2, the touch position t3 at row Y2, the touch position t4 between row Y2 and row Y3, the touch position t5 at row Y3, the touch position t6 between row Y3 and row Y4, and the touch position t7 of row Y4.

The line A3 in FIG. 9 indicates a total pressure of a position A3 on the touch screen 110 in FIG. 8. The position A3 in FIG. 8 are positions on the touch screen 110 between the unit sensors 510 of a line X[N−1] and the unit sensors 510 of a line X[N]. The position A3 in FIG. 8 may include the touch position t1 at row Y1, the touch position t2 between row Y1 and row Y2, the touch position t3 at the Y2 row, the touch position t4 between row Y2 and row Y3, the touch position t5 of row Y3, the touch position t6 between row Y3 and row Y4, and the touch position t7 at row Y4.

The line A4 in FIG. 9 indicates a total pressure of a position A4 on the touch screen 100 in FIG. 8. The position A4 in FIG. 8 indicates positions on the touch screen 110 of the unit sensors 510 on the line X[N]. The A4 positions in FIG. 8 may include the touch position t1 at row Y1, the touch position t2 between row Y1 and row Y2, the touch position t3 at row Y2, the touch position t4 between row Y2 and row Y3, the touch position t5 at row Y3, the touch position t6 between row Y3 and row Y4, and the touch position t7 at row Y4.

With respect to the line A1 in FIG. 9, the total pressure at the t1 corresponding to a most outer sensor is lower than the total pressure at the t3 to the t7 corresponding to the central area of the touch screen, and to the contrary, the total pressure at the t2 between the most outer sensor and a next sensor is rather higher than the total pressure at the t3 to the t7 corresponding to the central area of the touch screen. Therefore, there is more compensation for increasing the pressure information at the t1 touch position corresponding to the most outer sensor. However, compensation for decreasing the pressure information at the t2 touch position between the most outer sensor and the next sensor may also be used. The pressure information can be decreased to be less than the t2 touch position at the touch position t3, and thereafter, from t3 to t7.

With respect to the line A2 in FIG. 9, similar to the line A1, the total pressure, i.e., actual detected pressure, at the t1 corresponding to the most outer sensor is lower than the total pressure at t3 to t7 moving towards the central area of the touch screen, and the total pressure at the t2 between the most outer sensor and the next sensor is higher than the total pressure at the t3 to the t7 corresponding to the central area of the touch screen. Therefore, the pressure information at the touch position t1 is increased corresponding to the outer most sensor and the pressure information at the touch position t2 of the next sensor is increased less than at position t1. The pressure information is increased less at the t3 touch position, and thereafter, from t4 to t7.

With respect to the A3 line in FIG. 9, even though the total pressure at t1 corresponding to the most outer sensor is lower than the total pressure at t3 to t7 corresponding to the central area of the touch screen, the total pressure at t2 to t7 after the most outer sensor is higher. Therefore, the pressure information at the t1 touch position corresponding to the most outer sensor is increased, and at touch position thereafter the pressure information is increased less.

With respect to the A4 line in FIG. 9, the total pressure in all touch positions of t1 and t7 is low because they are close to the bottom edge of the housing unit 402. Therefore, the pressure information from all touch positions of t1 to t7 is increased. Thus, the pressure information at the first unit sensor in the most outer sensor of the touch position is increased, and the pressure information at the second sensor unit following the first unit sensor in the most outer sensor, and a third compensation for decreasing the pressure information lower than the second compensation in the touch position after the second unit sensor is decreased. That is, the controller 170 compensates for inaccurate pressure detections by increasing the pressure information on the touch position of the first unit sensor, which is the outermost sensor, and decreases the pressure information from the touch position between the most outer sensor, i.e., the first unit sensor and the second unit sensor located following the first unit sensor, and decreases the pressure information lower than the second compensation on the touch position from the second unit sensor, and thereafter by applying the preset compensation ratio for each position in the outer area.

Therefore, the controller 170 prevents erroneous detection of pressure information according to a position of a detected touch on the touch screen 110 by increasing or decreasing the pressure information by applying the compensation ratio for each position of the preset outer area.

Referring again to FIG. 7, in step 26, the controller 170 generates compensated position information by compensating for the inaccurate position information detected from the touch using the compensated pressure information, as described above.

For example, the controller 170 generates the compensated position information by comparing the compensated position information corresponding to the compensated pressure information, which is pre-stored in the memory 160. Also, the memory 160 may pre-store the compensated position information corresponding to at least one of the resistive value, the current value, or the voltage value with the compensated pressure information. Therefore, the controller 170 may generate the compensated position information by comparing the pre-stored compensated position information corresponding to at least one of the resistive value, the current value, or the voltage value along with the compensated pressure information.

Figure 10:
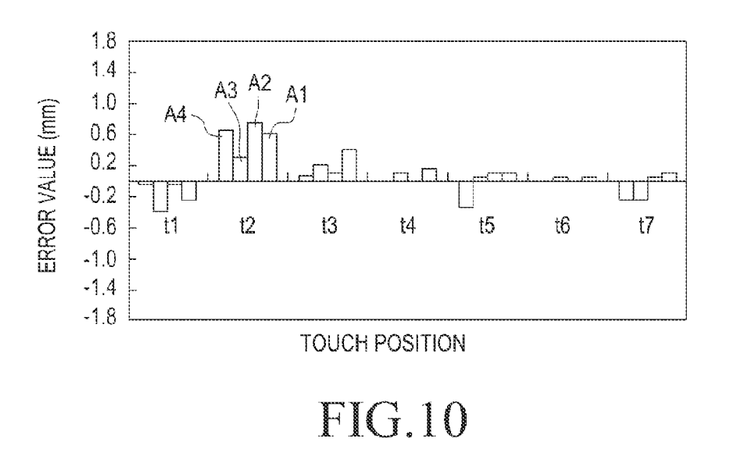
FIG. 10 is a graph illustrating a position error according to each touch position on a touch screen according to an embodiment of the present invention.

FIG. 10 is a graph showing a position error for each touch position of a touch screen according to an embodiment of the present invention.

Referring to FIG. 10, a Y-axis of the graph represents a value of the position error and an X-axis represents a touch position. Lines A1 to the A4 and touch positions of the lines t1 to t7 are the same as the touch position described in FIG. 8.

Referring to FIG. 10, the value of the position error is high on the t2 touch position of the lines A1 to A4. Therefore, more compensation is performed at the t2 touch position, i.e., position closest to the housing unit 402 of the portable terminal.

Referring again to FIG. 8, the t2 touch position is between the unit sensors 510 of row Y1 and the unit sensors of row Y2. That is, an area where the position error occurs as greatest is between row Y1 and row Y2, and it is the area between the first unit sensor which is located in the most outer area and the second unit sensor which is located following the first unit sensor.

Figure 11:
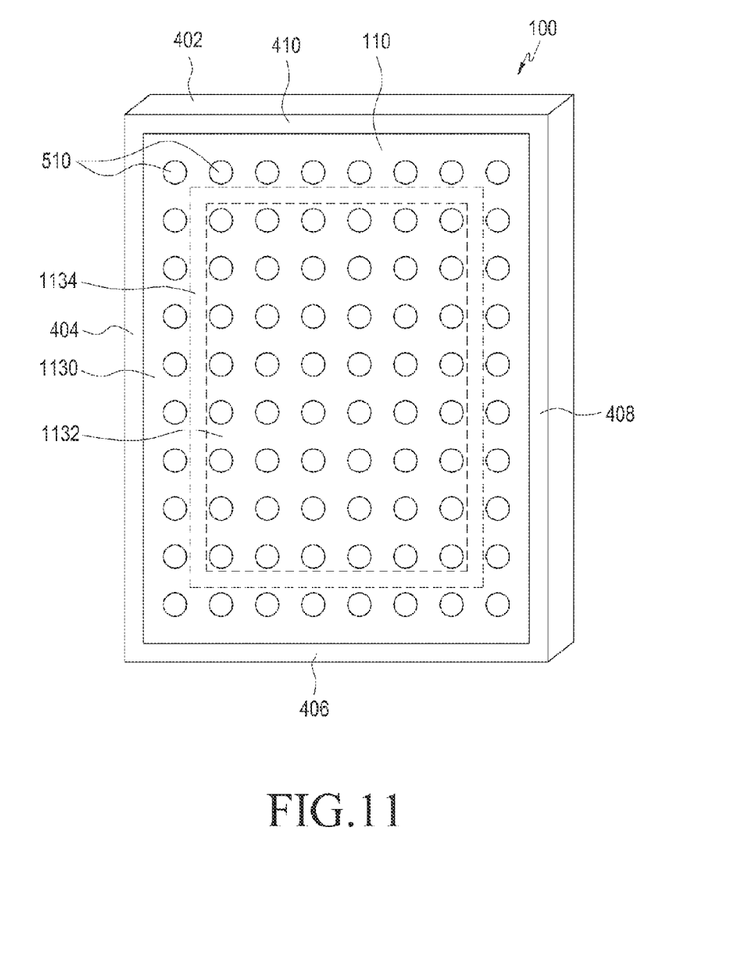
FIG. 11 illustrates a portable terminal according to an embodiment of the present invention.

FIG. 11 illustrates a portable terminal according to an embodiment of the present invention.

Referring to FIG. 11, an area 434 is located between the first unit sensors, which are located in the outer area 1130 located closest to the four sides 404, 406, 408, and 410 of the housing unit 402 of the touch screen 110, and the second unit sensor located following the first unit sensor. Therefore, according to another embodiment of the present invention, by defining the first unit sensor located on the outermost area 1130 of the touch screen 110 and the second unit sensor located following the first unit sensor as the area 1134, the erroneous detection of the touch position may be prevented by compensating the pressure information extracted from the touch when the touch is detected in the area 1134.

Figure 12:
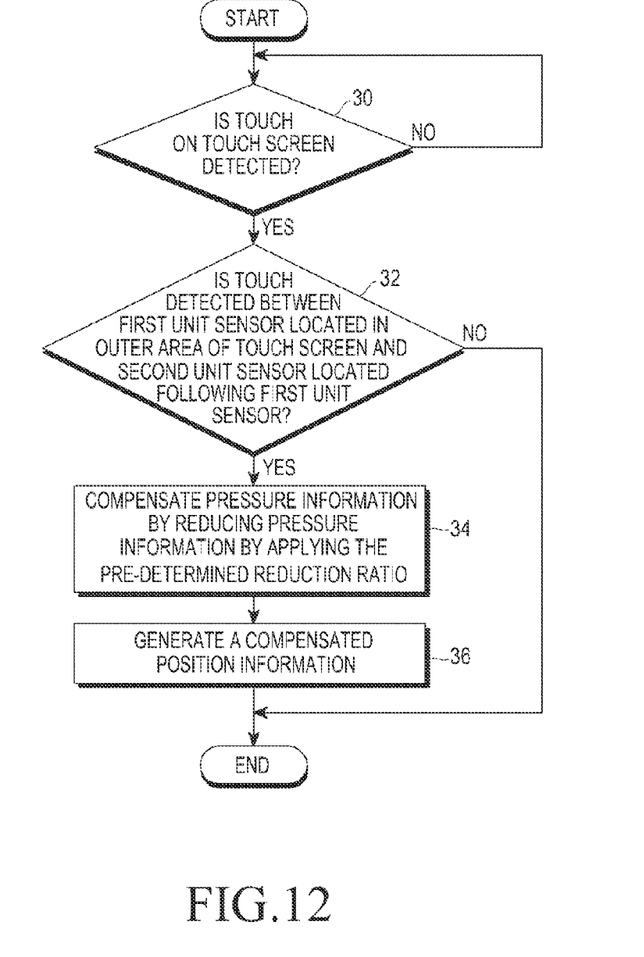
FIG. 12 is a flowchart illustrating a method of compensating for an input position error of a pressure detection touch screen according to an embodiment of the present invention.

FIG. 12 is a flowchart illustrating a method of compensating for an input position error of a pressure detection touch screen according to an embodiment of the present invention.

Referring to FIG. 12, in step 30, the controller 170 detects a touch on the touch screen 110.

In step 32, the controller 170 determines whether the touch is detected in area 1134 of FIG. 11, i.e., between the first unit sensor located in the outermost area 1130 of the touch screen 1130 and the second unit sensor located following the first unit sensor in area 1132.

In step 34, when it is determined that the touch is detected in the area 1134, the controller 170 compensates for an inaccurate pressure detection by reducing the pressure information by applying a preset reduction ratio. That is, the controller 170 reduces the pressure information by applying the preset reduction ratio for the pressure information extracted from the touch in step 30, when the touch is detected in area 1134.

In step 36, the controller 170 generates the compensated position information using the compensated pressure information. For example, the controller 170 compensates for the inaccurately detected position information by comparing the pre-stored compensated position information corresponding to the compensated pressure information and the compensated pressure information. Again, the memory 160 may also pre-store compensated position information corresponding to at least one of the resistive value, the current value, or the voltage value. Therefore, the controller 170 may also generate the compensated position information from the pre-stored compensated position information corresponding to at least one of the resistive value, the current value, or the voltage value.

Figure 13:
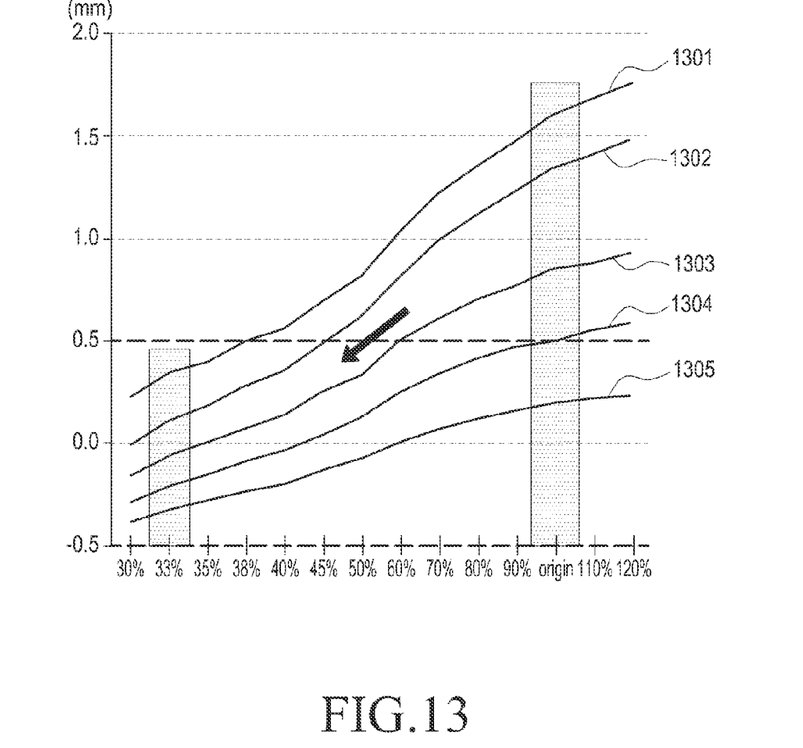
FIG. 13 is a graph illustrating a position error with respect to a preset reduction rate for pressure information compensation according to an embodiment of the present invention.

FIG. 13 is a graph illustrating a position error with respect to a preset reduction rate for pressure information compensation according to an embodiment of the present invention.

Referring to FIG. 13, an X axis is the preset reduction ratio for the pressure information compensation and a Y axis is the position error. The preset reduction ratio is a ratio at which the pressure information is reduced with respect to the extracted pressure information. Also, the position error is a difference between the actual touched position by the user input and the position information detected by the portable terminal.

In FIG. 13, the position error according to the preset reduction ratio for a plurality of points on the touch screen is shown. First, with respect to a first point 1301 on the touch screen, the position error is about 1.6 mm when the reduction ratio is not applied and the error reduces gradually according to reduction by the reduction ratio, and the error is about 0.5 mm when the reduction ratio is approximately 38%. Also, when the reduction ratio is approximately 33%, the position error becomes less than 0.5 mm, and thus, the error compensation of the input position of the pressure detection touch screen may be optimized because the position error becomes less than 0.5 mm.

With respect to a second point 1302, the position error is about 1.4 mm when the reduction ratio is not applied and the error reduces gradually according to reduction by the reduction ratio, and the error is about 0.5 mm when the reduction ratio is approximately 45%. Also, the position error becomes less than 0.2 mm when the reduction ratio is approximately 33%.

With respect to a third point 1303, the position error is about 0.8 mm when the reduction ratio is not applied and the error reduces gradually according to reduction by the reduction ratio, and the error is about 0.5 mm when the reduction ratio is approximately 60%. Also, the position error is less than 0.1 mm when the reduction ratio is approximately 33%.

With respect to a fourth point 1304, the position error is about 0.5 mm when the reduction ratio is not applied and the error reduces gradually according to reduction by the reduction ratio. Also, the position error becomes less than 0.2 mm when the reduction ratio is approximately 33%.

With respect to a fifth point 1305, the position error of 0.3 mm is generated when the reduction ratio is not applied and the position error may be reduced according to reduction by reduction ratio. Also, the position error becomes less than 0.4 mm when the reduction ratio is approximately 33%.

Therefore, based on the first point to the fifth point (1301 to 1305) of the touch screen 110, when the preset reduction ratio is 33%, the position error in all the points, i.e., the first to the fifth points (1301 to 1305), becomes less than 0.5 mm and the pressure compensation of the input position for the pressure detection touch screen is optimized.

Figure 14A:
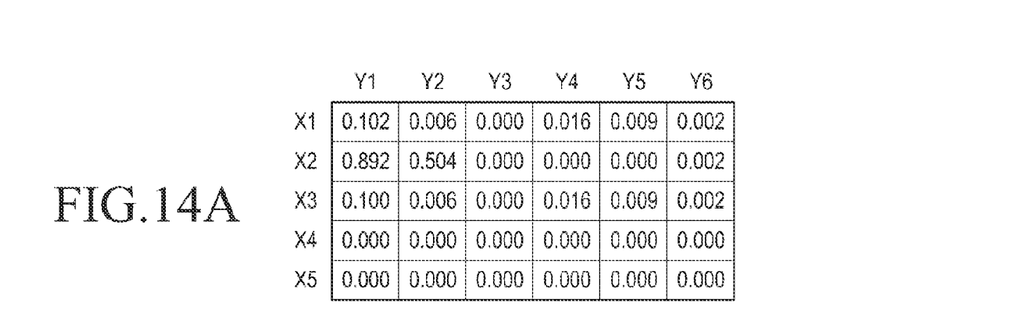
FIGS. 14A and 14B illustrate position errors according to each unit sensor when compensating pressure information by applying a preset reduction rate according to an embodiment of the present invention.
Figure 14B:
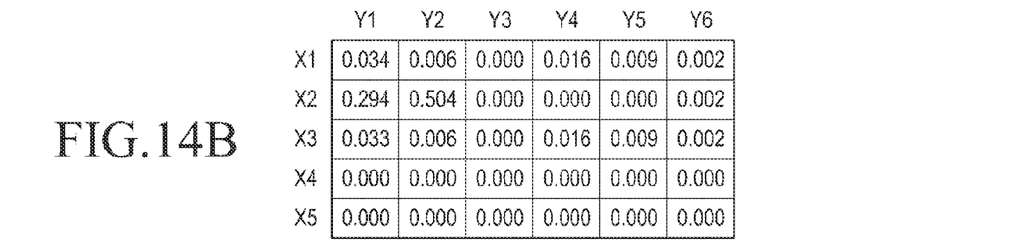

FIGS. 14A and B illustrate position errors according to each unit sensor for compensating for inaccurate pressure information by applying a preset reduction rate.

Referring to FIGS. 14A and 14B, a position error is provided for each unit sensor. More specifically, the position error for the unit sensors 510 of X[1] to X[5] rows and Y[1] to Y[6] columns are shown when the unit sensors on the touch screen of the portable terminal is arranged in X rows and Y columns, as illustrated in FIG. 8.

Referring to FIG. 14A, the position error occurs when the compensation for the pressure information is not performed. For example, a sum of the position error of the unit sensors in a Y[1] column is 1.095 mm and the sum of the position error of the unit sensor in an X[2] row is 1.394 mm.

Referring to FIG. 14B, the position error for compensating for the inaccurate pressure information with the pre-stored reduction ratio of 33% is shown. For example, the sum of the position error of the unit sensors in the Y[1] column is 0.361 mm and the sum of the position error of the unit sensors in X[2] row is 0.797 mm. Therefore, as described above, the position error is significantly reduced when the pressure compensation is compensated by the pre-stored reduction ratio of 33%.

The above-described embodiments of the present invention may also be implemented by hardware or a combination of hardware and software. The software may be stored, for example, regardless of whether a delete function or re-record function is provided or not, in a volatile or non-volatile storage device including a storage device such as a Read-Only Memory (ROM) or a memory such as a Random Access Memory (RAM), a memory chip, or an integrated circuit, and a storage medium such as a Compact Disc (CD), a Digital Versatile Disc (DVD), a magnetic disk, or a magnetic tape which performs an optical or magnetic recording as well as being readable by a machine (e.g., a computer).

Also, the above-described embodiments of the present invention may be implemented by a computer or a portable terminal including a controller and a memory, which may be an example of a machine readable storage medium suitable for storing a program or programs including instructions that implement embodiments of the present invention. Therefore, the present invention includes a machine (e.g., a computer) readable storage medium which stores a program or programs including codes for implementing a method described by the appended claims. Also, such a program may be electrically transmitted through any medium similar to a communication signal which is propagated by wire or wirelessly, and the present invention includes equivalents thereof.

According to embodiments of the present invention, it is advantageous in that an erroneous recognition of an input may be prevented by compensating for inaccurate position information of an input by a user input in a pressure detection touch screen.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method for improving input position and pressure detection in a pressure detection touch screen, the method comprising:

detecting a touch input on a touch screen;
   generating compensated pressure information for compensating for inaccurate pressure information detected from the touch input, when the touch input is detected in an outer area on the touch screen; and
   generating compensated location information using the compensated pressure information.

2. The method of claim 1, wherein compensating for the inaccurate pressure information comprises increasing or decreasing the detected pressure information by applying a preset compensation ratio for each position of the outer area.

3. The method of claim 1, wherein the outer area on the touch screen is an area between a first unit sensor located in an outermost area of the touch screen and a second unit sensor located next to the first unit sensor.

4. The method of claim 1, wherein the outer area on the touch screen is an area between a first unit sensor located in an outermost area of the touch screen and a second unit sensor located following the first unit sensor, and wherein compensating for the inaccurate pressure information comprises decreasing the detected pressure information by applying a preset reduction ratio.

5. The method of claim 4, wherein the preset reduction ratio is 33%.

6. A non-transitory machine readable recording medium for storing a program for executing a method for improving input position and pressure detection of a pressure detection touch screen, the method comprising:

detecting a touch input on a touch screen;
   generating compensated pressure information for compensating for inaccurate pressure information detected from the touch input, when the touch input is detected in an outer area on the touch screen; and
   generating compensated location information using the compensated pressure information.

7. A portable terminal comprising a pressure detection touch screen and a non-transitory machine readable recording medium for storing a program for executing a method for improving input position and pressure detection of a pressure detection touch screen, the method comprising:

detecting a touch input on a touch screen;
   generating compensated pressure information for compensating for inaccurate pressure information detected from the touch input, when the touch input is detected in an outer area on the touch screen; and
   generating compensated location information using the compensated pressure information.

8. A portable terminal comprising:

a pressure detection touch screen; and
   a controller configured detect a touch input on a touch screen, generate compensated pressure information for compensating for inaccurate pressure information detected from the touch input, when the touch input is detected in an outer area on the touch screen, and generate compensated location information using the compensated pressure information.

9. The portable terminal of claim 8, wherein the controller compensates for the inaccurate pressure information by increasing or decreasing the detected pressure information by applying a preset compensation ratio for each position of the outer area.

10. The portable terminal of claim 8, wherein the outer area of the touch screen is an area between a first unit sensor located in an outermost area of the touch screen and a second unit sensor located next to the first unit sensor.

11. The portable terminal of claim 8, wherein the outer area of the touch screen is an area between a first unit sensor located in an outermost area of the touch screen and a second unit sensor located following the first unit sensor, and
wherein the controller compensate for the inaccurate pressure information by decreasing the detected pressure information by applying a preset reduction ratio.

12. The portable terminal of claim 11, wherein the preset reduction ratio is 33%.

\* \* \* \* \*